United States Patent
Wang et al.

(10) Patent No.: US 9,678,897 B2
(45) Date of Patent: Jun. 13, 2017

(54) APPROACH FOR CONTEXT SWITCHING OF LOCK-BIT PROTECTED MEMORY

(71) Applicant: NVIDIA Corporation, Santa Clara, CA (US)

(72) Inventors: Nicholas Wang, Saratoga, CA (US); Shirish Gadre, Fremont, CA (US); Robert Ohannessian, Austin, TX (US); Lacky V. Shah, Los Altos Hills, CA (US); Matthew Brockmeyer, San Jose, CA (US); Stewart Glenn Carlton, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 132 days.

(21) Appl. No.: 13/728,813

(22) Filed: Dec. 27, 2012

(65) Prior Publication Data
US 2014/0189260 A1    Jul. 3, 2014

(51) Int. Cl.
G06F 9/46     (2006.01)
G06F 12/14    (2006.01)
G06F 9/52     (2006.01)
G06F 17/30    (2006.01)

(52) U.S. Cl.
CPC .......... G06F 12/1416 (2013.01); G06F 9/46 (2013.01); G06F 9/52 (2013.01); G06F 12/1466 (2013.01); G06F 17/30171 (2013.01)

(58) Field of Classification Search
None
See application file for complete search history.

(56) References Cited

U.S. PATENT DOCUMENTS

| | | | |
|---|---|---|---|
| 6,662,252 B1 * | 12/2003 | Marshall et al. | 710/200 |
| 6,823,511 B1 * | 11/2004 | McKenney et al. | 718/102 |
| 7,373,640 B1 * | 5/2008 | English | G06F 8/456 |
| | | | 712/203 |
| 8,373,710 B1 * | 2/2013 | Vij | G06F 9/5044 |
| | | | 345/502 |
| 8,683,470 B2 * | 3/2014 | Omara | G06F 9/4843 |
| | | | 718/102 |
| 8,789,057 B2 * | 7/2014 | Dice et al. | 718/101 |
| 2004/0019892 A1 * | 1/2004 | E | G06F 17/30362 |
| | | | 718/107 |

(Continued)

*Primary Examiner* — Kaushikkumar Patel
(74) *Attorney, Agent, or Firm* — Artegis Law Group, LLP

(57) ABSTRACT

A streaming multiprocessor in a parallel processing subsystem processes atomic operations for multiple threads in a multi-threaded architecture. The streaming multiprocessor receives a request from a thread in a thread group to acquire access to a memory location in a lock-protected shared memory, and determines whether a address lock in a plurality of address locks is asserted, where the address lock is associated the memory location. If the address lock is asserted, then the streaming multiprocessor refuses the request. Otherwise, the streaming multiprocessor asserts the address lock, asserts a thread group lock in a plurality of thread group locks, where the thread group lock is associated with the thread group, and grants the request. One advantage of the disclosed techniques is that acquired locks are released when a thread is preempted. As a result, a preempted thread that has previously acquired a lock does not retain the lock indefinitely.

20 Claims, 7 Drawing Sheets

(56) References Cited

U.S. PATENT DOCUMENTS

| | | | |
|---|---|---|---|
| 2005/0283783 A1* | 12/2005 | DeSota | G06F 9/3851 718/100 |
| 2009/0240860 A1* | 9/2009 | Coon et al. | 710/200 |
| 2010/0031269 A1* | 2/2010 | Fontenot | G06F 9/524 718/107 |
| 2010/0100655 A1* | 4/2010 | Dowedeit | G06F 9/526 710/200 |
| 2010/0161572 A1* | 6/2010 | Daum | G06F 9/526 707/704 |
| 2010/0250809 A1* | 9/2010 | Ramesh et al. | 710/200 |
| 2010/0333096 A1* | 12/2010 | Dice | G06F 12/00 718/102 |
| 2012/0023505 A1* | 1/2012 | Shin | G06F 9/526 718/108 |
| 2012/0143838 A1* | 6/2012 | Ross et al. | 707/704 |
| 2012/0310881 A1* | 12/2012 | Shadmon | G06F 17/30578 707/613 |
| 2013/0290967 A1* | 10/2013 | Calciu et al. | 718/102 |
| 2014/0059261 A1* | 2/2014 | Wang | G06F 9/524 710/200 |
| 2014/0075450 A1* | 3/2014 | Bates | G06F 9/461 718/108 |
| 2014/0082632 A1* | 3/2014 | Tene | G06F 9/3001 718/108 |
| 2014/0181421 A1* | 6/2014 | O'Connor | G06F 9/50 711/148 |

\* cited by examiner

APPROACH FOR CONTEXT SWITCHING OF LOCK-BIT PROTECTED MEMORY

BACKGROUND OF THE INVENTION

1. Field of the Invention

The present invention generally relates to graphics processing unit (GPU) architectures, and, more particularly, to an approach for a context switching of lock-bit protected memory.

2. Description of the Related Art

A common practice in graphics processing units (GPUs) is to include one or more shared memories that support atomic operations. An atomic operation is one where a first processor reads from a memory location and subsequently writes a new value to the same memory location while other processors and input/output devices are prevented from accessing the same memory location until the first processor completes the read and the subsequent write to the shared memory. Such an atomic operation may be called a read-modify-write operation. Atomic operations ensure that a processor can perform as a read-modify-write as an undivided operation.

One approach to implementing atomic operations is to provide a load-lock and a store-unlock instruction pair. When a processor performs an atomic operation that is associated with a certain memory location, the processer first executes a load-lock instruction directed to the memory location. The load-lock instruction reads the memory location, and simultaneously secures a lock on the memory location. The lock prevents other processors and I/O devices from accessing the memory location. The processor then modifies the value read from the memory location, as desired, and executes a store-unlock instruction. The store-unlock instruction writes the modified value to the memory location, and releases the lock. Once the lock is released, other processors and I/O devices may access the memory location. If a processor is denied access to a memory location due to a lock, then the processor continues to attempt to access the memory location until the lock is released and the access is successful. This type of approach ensures that processors and I/O devices successfully perform atomic operations, because a locked memory location may not be modified by other processors until the read-modify-write operation completes, and the memory lock is released.

One drawback to the above approach is that an instance of a process, known as a thread, may be preempted while the thread is in the middle of an atomic operation. In other words, a first thread may execute a load-lock instruction, securing a lock on a shared memory location, and then be preempted by a second thread prior to executing the store-unlock instruction. In such cases, when the first thread is preempted, the processor stores the context of the first thread and begins execution on the second thread. Eventually, the context for the first thread is restored, and the first thread completes the atomic operation. During the time of preemption, however, the first thread retains the lock on the shared memory. Thus, other threads are prevented from accessing the locked memory location for an indeterminately long period of time, resulting in a loss of performance. Further, one memory lock may be shared between thread groups accessing different memory locations. If the first thread cannot resume execution until the second thread secures the lock held by the first thread, then a deadlock may occur. With deadlock, the second thread continues, unsuccessfully, to acquire the lock retained by the first preempted thread, and the first thread never resumes execution. As is well-appreciated, deadlock negatively impacts overall performance.

As the foregoing illustrates, what is needed is a more effective way to perform atomic operations in a multi-threaded processing architecture.

SUMMARY OF THE INVENTION

One embodiment of the present invention sets forth a method for processing atomic operations for a plurality of threads in a multi-threaded architecture. The method includes receiving a first request from a first thread in a first thread group to acquire access to a first memory location in a lock-protected shared memory, and determining whether a first address lock in a plurality of address locks is asserted, where the first address lock is associated the first memory location. If the first address lock is asserted, then the method further includes refusing the first request. If the first address lock is not asserted, then the method further includes asserting the first address lock, asserting a first thread group lock in a plurality of thread group locks, where the first thread group lock is associated with the first thread group, and granting the first request.

Other embodiments include, without limitation, a subsystem that includes a streaming multiprocessor configured to implement one or more aspects of the disclosed methods as well as a system configured to implement one or more aspects of the disclosed methods.

One advantage of the disclosed techniques is that acquired locks are released when a thread is preempted. As a result, a preempted thread that has previously acquired a lock does not retain the lock indefinitely. Active threads may acquire the lock previously acquired by the preempted thread, resulting in improved performance and deadlock avoidance. When the preempted thread resumes, the thread reacquires the previously released lock before completing the atomic operation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
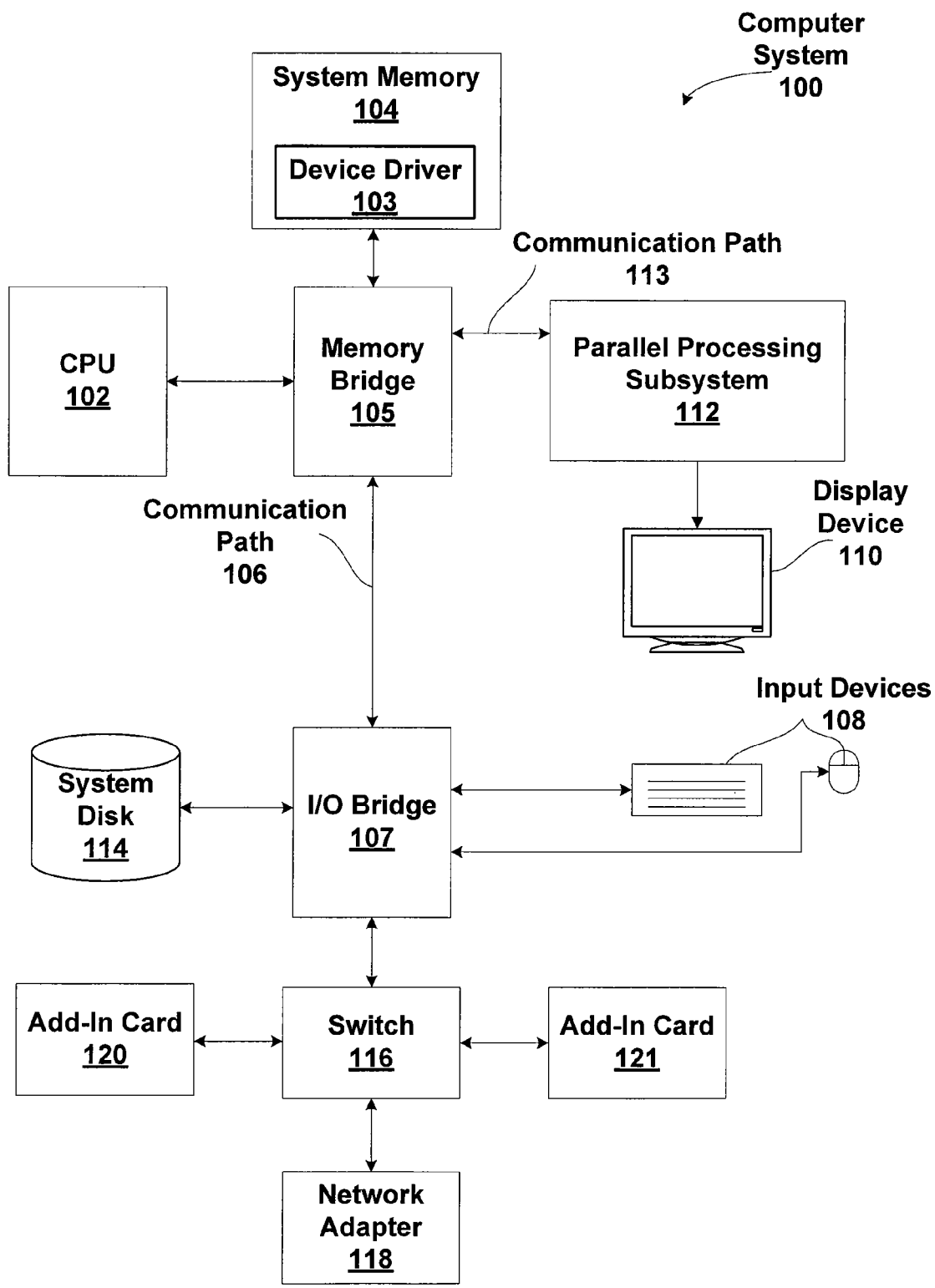
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
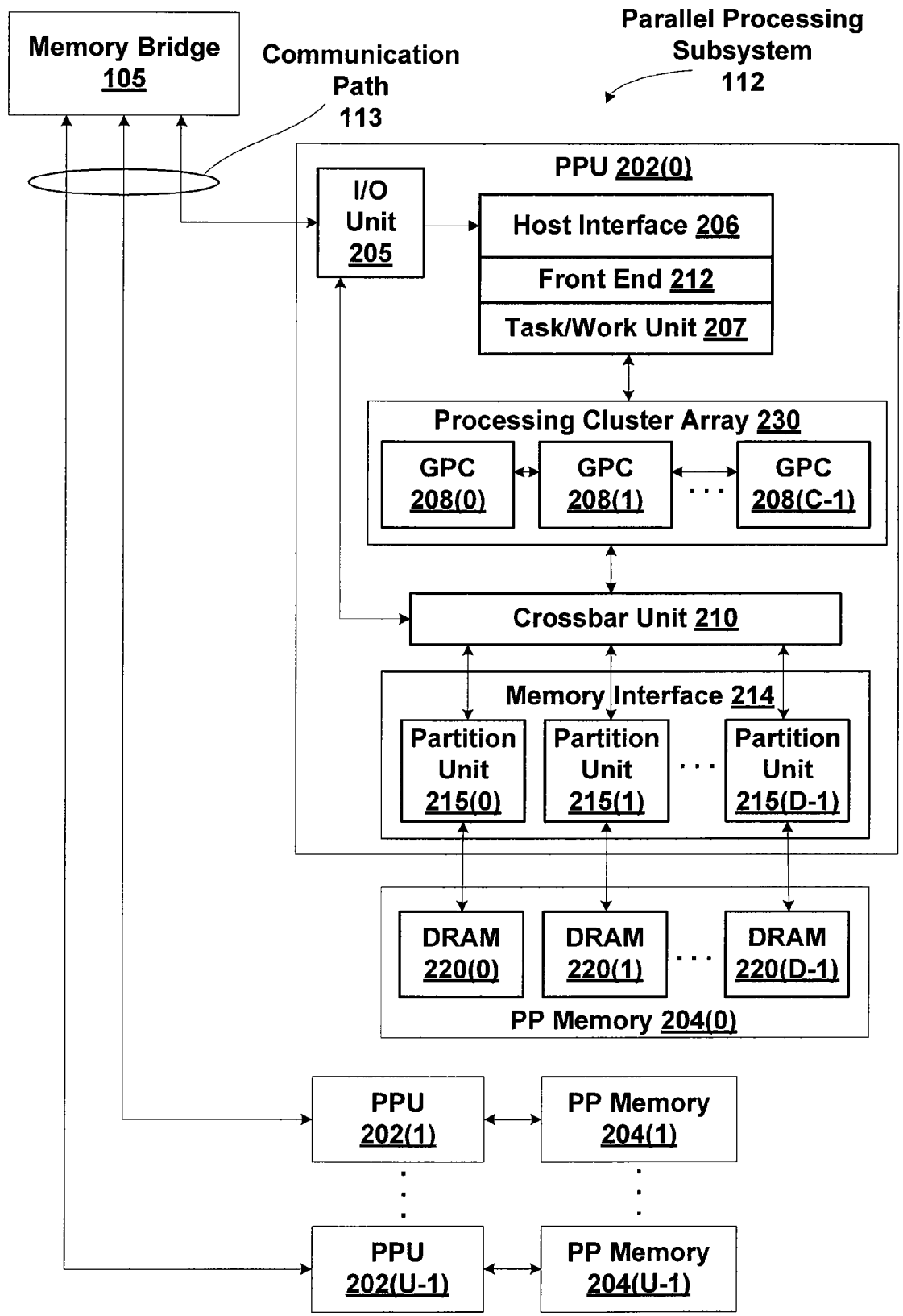
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
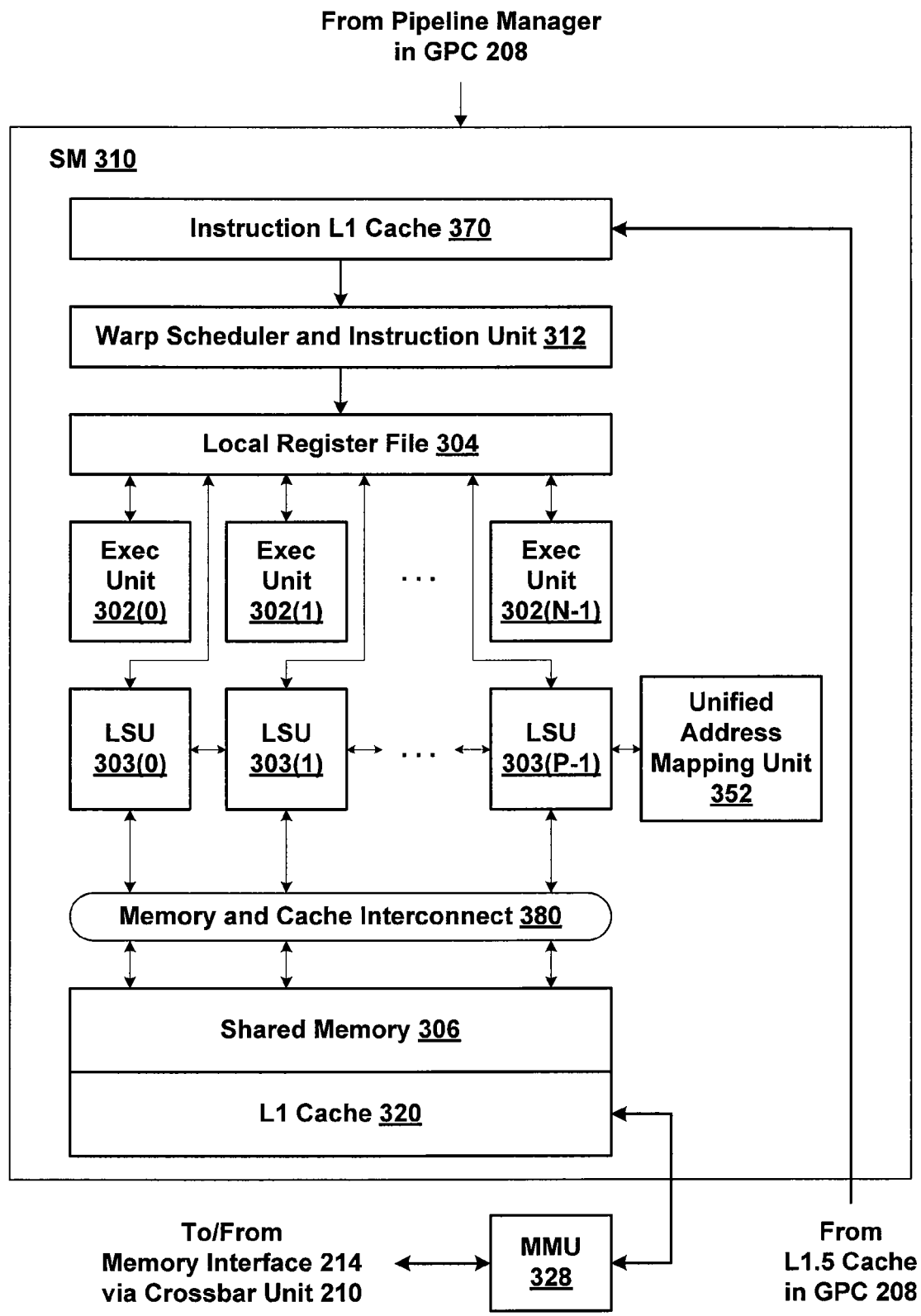
FIG. 3 is a block diagram of a streaming multiprocessor (SM) within a GPC of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches 208 to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Context Switching of Lock-Bit Protected Memory

As threads within a CTA execute in parallel, one or more threads may atomically access locations in the shared memory 306. Such atomic operations permit a thread to load a value from a memory location, modify the value retrieved from the location, and store the modified value to the memory location, while ensuring that other threads have not modified the value in the memory location between the load and store operations. One approach to supporting atomic operations includes a load instruction that requests a lock to a memory location within the shared memory 306, and a corresponding store instruction that releases the lock. When a thread is preempted, causing a context switch, all pending locks are released. As further described below, the SM 310 supports two lock-bit structures to implement atomic operations, the first of which is an address lock-bit structure.

Figure 4:
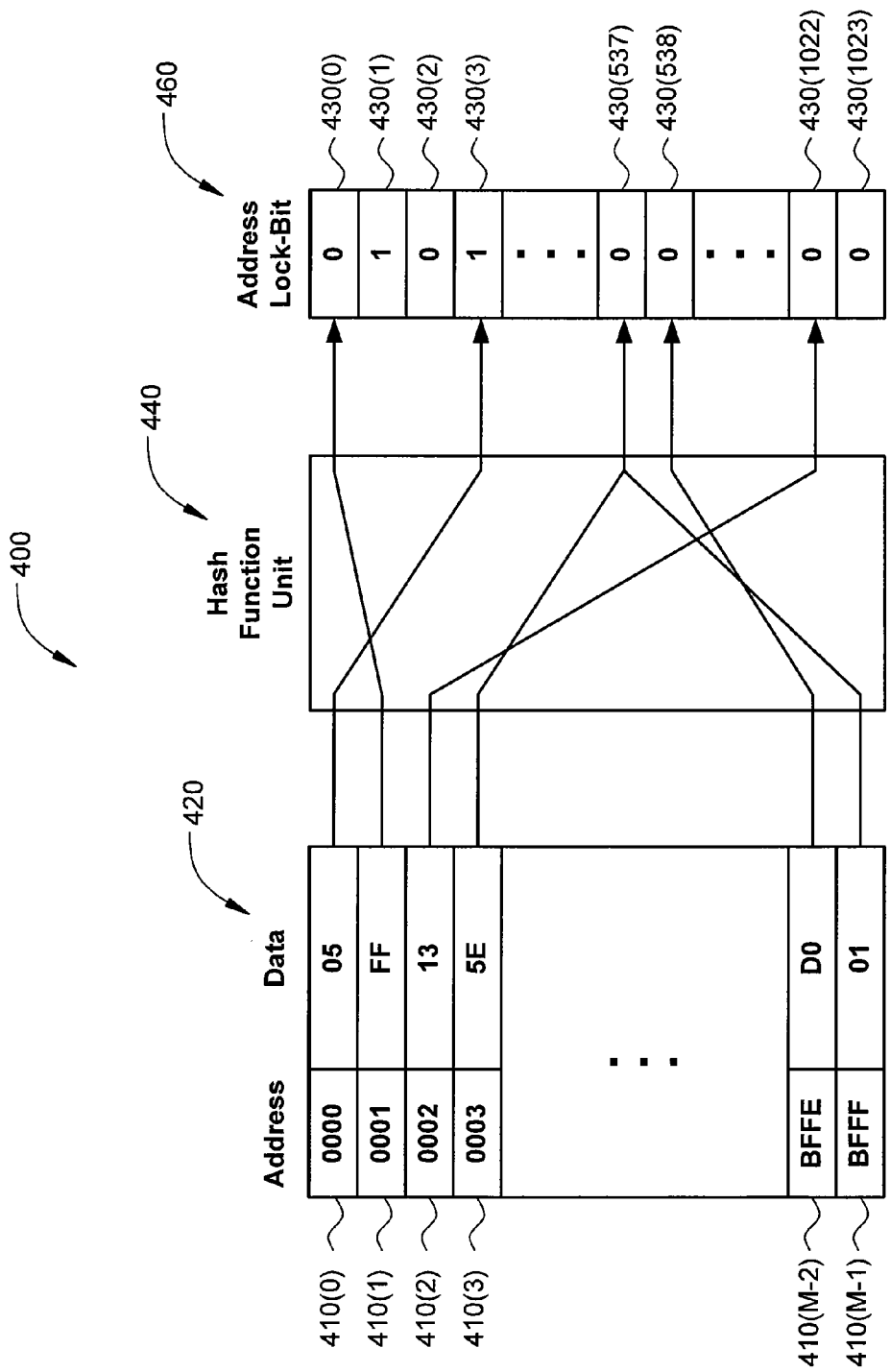
FIG. 4 illustrates an address lock-bit structure for the shared memory of the streaming multiprocessor (SM) of FIG. 3, according to one embodiment of the present invention.

FIG. 4 illustrates an address lock-bit structure 400 for the shared memory 306 of the streaming multiprocessor (SM) 310 of FIG. 3, according to one embodiment of the present invention. As shown, the address lock-bit structure 400 includes a lock-protected shared memory 420, a hash function unit 440, and an address lock-bit table 460.

The lock-protected shared memory 420 is a portion of the shared memory 306 that supports atomic operations. The lock-protected shared memory 420 is a block of 'M' memory locations 410(0)-410(M-1), where each memory location is associated with an address and a data value. As shown, the lock-protected shared memory 420 includes 49,152 memory locations (corresponding to an address range of 0x0000 through 0xBFFF), where each memory location includes one 8-bit byte of data.

If a thread performs an atomic operation to a memory location within the lock-protected shared memory 420, then the thread first acquires a lock associated with the memory location by executing an instruction to load from shared memory 306 and lock the memory location (LDSLK instruction). Once the thread acquires a lock, the thread modifies the data and then stores the modified data at the locked memory location using an instruction to store the data to shared memory and conditionally unlock the memory location (STSCUL instruction). As further described below, the conditional unlock is successful unless the lock was released, such as when a thread is preempted, causing the release of all pending locks.

The hash function unit 440 is a subsystem that maps addresses in the lock-protected shared memory 420 to corresponding address lock-bits 430 in the address lock-bit table 460. Typically, the lock-protected shared memory 420 includes more memory locations than there are address lock-bits 430. In such cases, each address lock-bit 430 maps to more than one memory location in the lock-protected shared memory 420. Exemplary hash function unit 440 mappings are shown, while other mappings are omitted for clarity. As shown, the hash function unit 440 maps memory location 410(0) with address 0000 to address lock-bit 430(3), memory location 410(1) with address 0001 to address lock-bit 430(0), memory location 410(2) with address 0002 to address lock-bit 430(1022), and so on. The hash function maps both memory location 410(3) at address 0003 and memory location 410(M-1) at address BFFF to address lock-bit 430(537). Finally, the hash function maps memory location 410(M-2) at address BFFE to address lock-bit 430(538).

The hash function may include any technically feasible hash algorithm to map addresses in the lock-protected shared memory 420 to corresponding address lock-bits 430 in the address lock-bit table 460. In one example, the address lock-bit table 460 could be partitioned to support accesses to 32 banks within the lock-protected shared memory 420, where each of the 32 banks includes 32 address lock-bits 430. When a thread acquires an address lock, the SM 310 could grant the lock for a 32-bit double-word data value that is aligned on a 32-bit double-word boundary. In such a case, the two least significant bits (LSBs) of the memory location 410 address would identify a particular byte within the 32-bit double word. Access requests for less than 32-bits of data would acquire a lock on an aligned 32-bit double-word that includes the requested data. Access requests larger than 32-bits, such as vector accesses, would result in acquiring multiple locks. In such cases, the SM 310 would return a successful status if all corresponding lock requests are successfully acquired. The next 5 bits of memory location 410 address would identify one of the 32 banks of address lock-bits 430 within the address lock-bit table 460. The next five bits of memory location 410 address would identify a particular address lock-bit 430 within the given bank of address lock-bits 430.

The address lock-bit table 460 is an array of address lock-bits 430, where each address lock-bit 430 corresponds to one or more memory locations 410 in the lock-protected shared memory 420. When a thread requests a lock for a memory location 410 in the lock-protected shared memory 420, the hash function unit 440 maps the memory location 410 to a corresponding address lock-bit 430 in the address lock-bit table 460. If the address lock-bit 430 is clear, then SM 310 grants the lock request. In such a case, the SM 310 sets the address lock-bit 430 and grants the lock to the requesting thread. If the address lock-bit 430 is set, then the SM 310 refuses the lock request, and the thread continues to request a lock until the lock is granted. In some embodiments, the SM 310 may also refuse the lock request if the thread requests a lock for a memory location that is not in the address range of the lock-protected shared memory 420.

In addition to setting an address lock-bit 430 when a lock is granted, the SM 310 also sets a corresponding warp lock-bit, as further described below.

Figure 5:
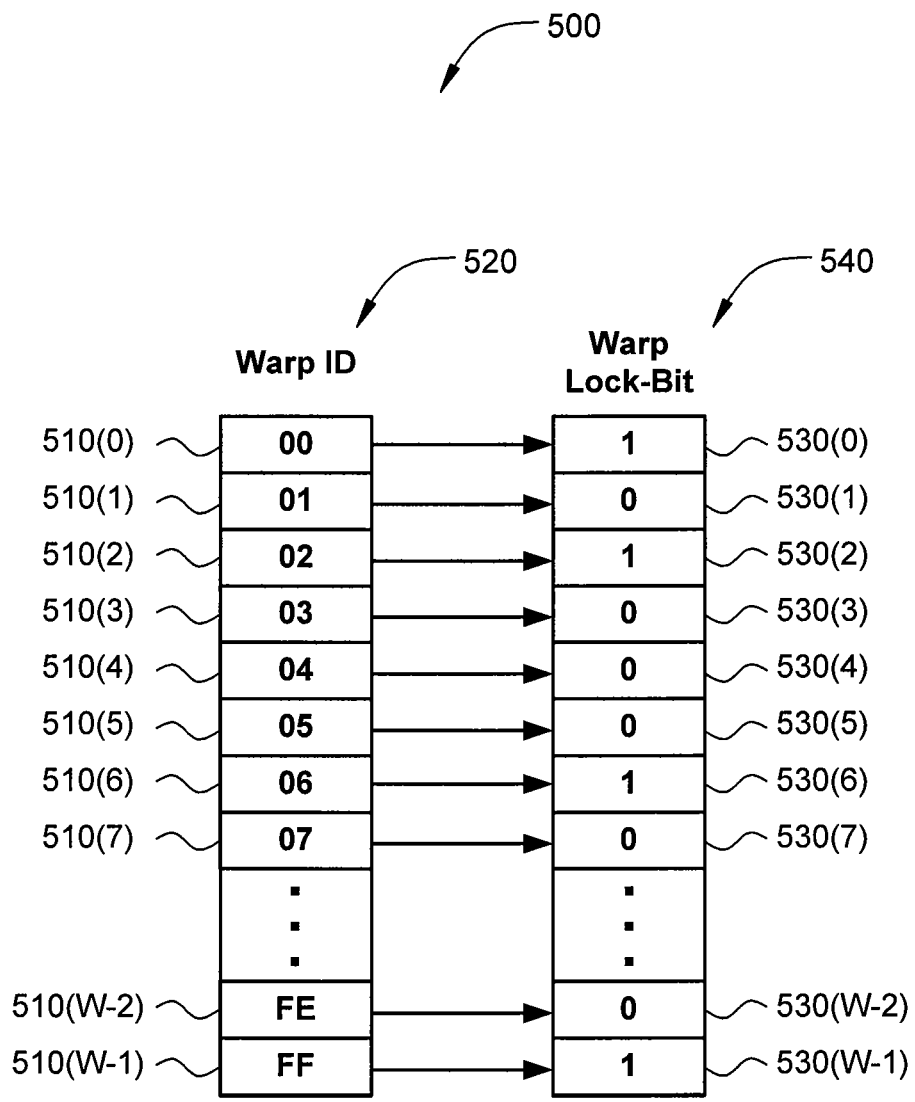
FIG. 5 illustrates a warp lock-bit structure for the streaming multiprocessor (SM) of FIG. 3, according to one embodiment of the present invention.

FIG. 5 illustrates a warp lock-bit structure 500 for the streaming multiprocessor (SM) 310 of FIG. 3, according to one embodiment of the present invention. As shown, the warp lock-bit structure 500 includes a set of warps 520, each warp (or thread group) being identified with a warp ID 510, and a warp lock-bit table 540.

The set of warps 500 represents one or more warps executing on a particular SM 310. Each warp in the set of warps 520 is associated with a warp ID 510. The warp ID 510 uniquely identifies a given warp. As described above in conjunction with FIG. 3, each thread in a warp concurrently executes the same program on different input data, with one thread of the group being assigned to a different processing engine within an SM 310. Each thread corresponds to a warp lock-bit 530 in the warp lock-bit table 540.

The warp lock-bit table 540 is an array of warp lock-bits 530, where each warp lock-bit 530 corresponds to a given warp in the set of warps 520. When a thread requests a lock for a memory location 410 in the lock-protected shared memory 420, the SM 310 tests the warp-lock bit 530 for the warp that includes the requesting thread. If the warp lock-bit 530 is clear, then the lock request is granted. In such a case, the SM 310 sets the warp lock-bit 530 and grants the lock to the requesting thread. If the warp lock-bit 530 is set, then the lock request is refused. In one embodiment, a thread that fails to acquire a requested lock may continue to request the lock until the lock is granted. In another embodiment, an exception may occur when a thread fails to acquire a requested lock. In response to the exception, the SM 310 may wait for the lock to clear, or may rescind the lock if the lock does not clear within a fixed amount of time. In such cases, a thread that issues a lock request (e.g. by executing a LDSLK instruction) may not issue another lock request without first issuing a conditional unlock (e.g. by executing a STSCUL instruction).

If the warp lock-bit 530 is set for the warp associated with the requesting thread, then the LDSLK instruction fails. Otherwise, the LDSLK succeeds, and the SM 310 sets the corresponding warp lock-bit 530 and address lock-bit 430. Typically, a thread acquires and holds one lock for one memory location 410 (or a contiguous block of memory locations 410 for vector operations) at any given time. A warp can acquire and hold multiple locks to where each thread in the warp performs a successful LDSLK instruction to memory locations 410 in the lock-protected shared memory 420 at the same time.

When a thread completes the atomic operation, the thread executes a STSCUL instruction. If both the warp lock-bit 530 and the address lock-bit 430 are set, and the memory location 410 is valid, then the SM 310 returns a successful status to the STSCUL instruction. The SM 310 then releases both the warp lock-bit 530 and the address lock-bit 430. If the warp-lock bit 530 is clear, then the STSCUL instruction fails, even if the address lock-bit 430 is set.

In some embodiments, when multiple warps are operating in a CTA, any thread in a warp may be preempted, causing a context switch. For example, a thread could execute an illegal instruction, causing a trap. In such cases, the state of all warps in the CTA would be saved and all warps would enter a trap handler. If the threads in such warps are performing atomic operations, then the SM 310 clears the address lock-bits 430 and the warp lock-bits 530 for all threads that have acquired locks when the state of the CTA is saved. When execution resumes, any thread that previously acquired a lock then reacquires the lock before completing the atomic operation. As such, the state of the address lock-bit table 460 and the warp lock-bit table 540 are not saved, and lock-bit status need not be maintained on a context switch.

Clearing all lock-bits on a context switch reduces or eliminates certain race conditions that may otherwise occur. In one example, a first warp could acquire a lock for memory location 410(0). Then a thread within the CTA could be preempted, which would cause all address lock-bits 430 and warp lock-bits 530 to clear. After execution resumes for all threads, a second warp could acquire a lock to the memory location 410(0). When the first warp attempts to release the lock for memory location 410(0), the SM 310 would determine that, even though the address lock-bit 430(3) is set for memory location 410(0), the warp lock-bit 530 for the first warp is clear. The SM 310 would refuse the lock, causing the requesting thread in the first warp to reacquire the lock. The thread would then attempt the atomic operation again.

In some embodiments, the techniques disclosed herein may employ a single data structure that includes both the address lock and the warp lock. In such a case, each entry in the data structure may include the warp ID of the thread group that acquired the lock and a status flag indicating whether any warp has a lock for a given memory location. In such cases, when the SM 310 grants the lock to the requesting thread, the SM 310 may select the entry in the data structure corresponding to the given memory location. The SM 310 may store the warp ID of the requesting thread in the selected entry, and may set the status flag indicating that a warp has a acquired a lock for the given memory location. When a thread is preempted, the SM 310 may clear all the status flags in the data structure, thus removing all acquired locks. When a thread accesses a memory location for which the thread acquired a lock, the access may fail when the correct warp ID is stored in the data structure but the status flag is clear.

A thread performing an atomic operation may use the following algorithm set forth in Table 1:

TABLE 1

| 10 | START: | | |
|----|--------|--------|------------------|
| 20 |        | LDSLK  | Pk, Rd, [addr];  |
| 30 | @Pk    | IADD   | Rd, Rd, 1;       |
| 40 | @Pk    | STSCUL | Pk, [addr], Rd;  |
| 50 | @!Pk   | BRA    | START;           |

In this particular algorithm, a thread performing an atomic operation first executes an LDSLK instruction to load a value from a memory location 410 in the lock-protected shared memory 420 and request a lock to the memory location. As shown in line 20 above, the LDSLK instruction loads the value from the memory location 410 with an address "addr" and stores the value in register R0. The LDSLK instruction returns a value Pk depends on whether the thread acquired the requested lock. Pk is "TRUE" if the lock was successful, and the thread acquired the lock. Pk is "FALSE" if the lock was not successful, and the thread did not acquire the lock. At line 30, the thread executes an arithmetic operation on the value retrieved from the memory location 410. As shown, the thread performs an integer add of "1" to the value and stores the incremented value back to register R0. In some embodiments, the integer add may be performed only if the LDSLK returned a true value (@Pk). In other embodiments, the integer add may be performed unconditionally.

At line 40, the thread stores the incremented value and attempts to release the lock on the memory location 410 by executing a STSCUL instruction issued to the same memory location specified in the LDSLK instruction of line 20. The STSCUL instruction is performed only if the LDSLK instruction returned a true value (@Pk). At line 50, the thread branches back to line 10 if either the STSCUL instruction or the LDSLK instruction returned a false value (@!Pk), indicating that the atomic operation failed, and the thread attempts to acquire the lock again. If the LDSLK instruction returns a false value, then the STSCUL instruction is not executed, and, therefore, the STSCUL instruction does not return any value. However, the false value returned from the LDSLK causes the thread to branch back to line 10. If neither the LDSLK instruction nor the STSCUL instruction returns a false value, then the atomic operation was successful, and the thread continues execution.

Figure 6A:
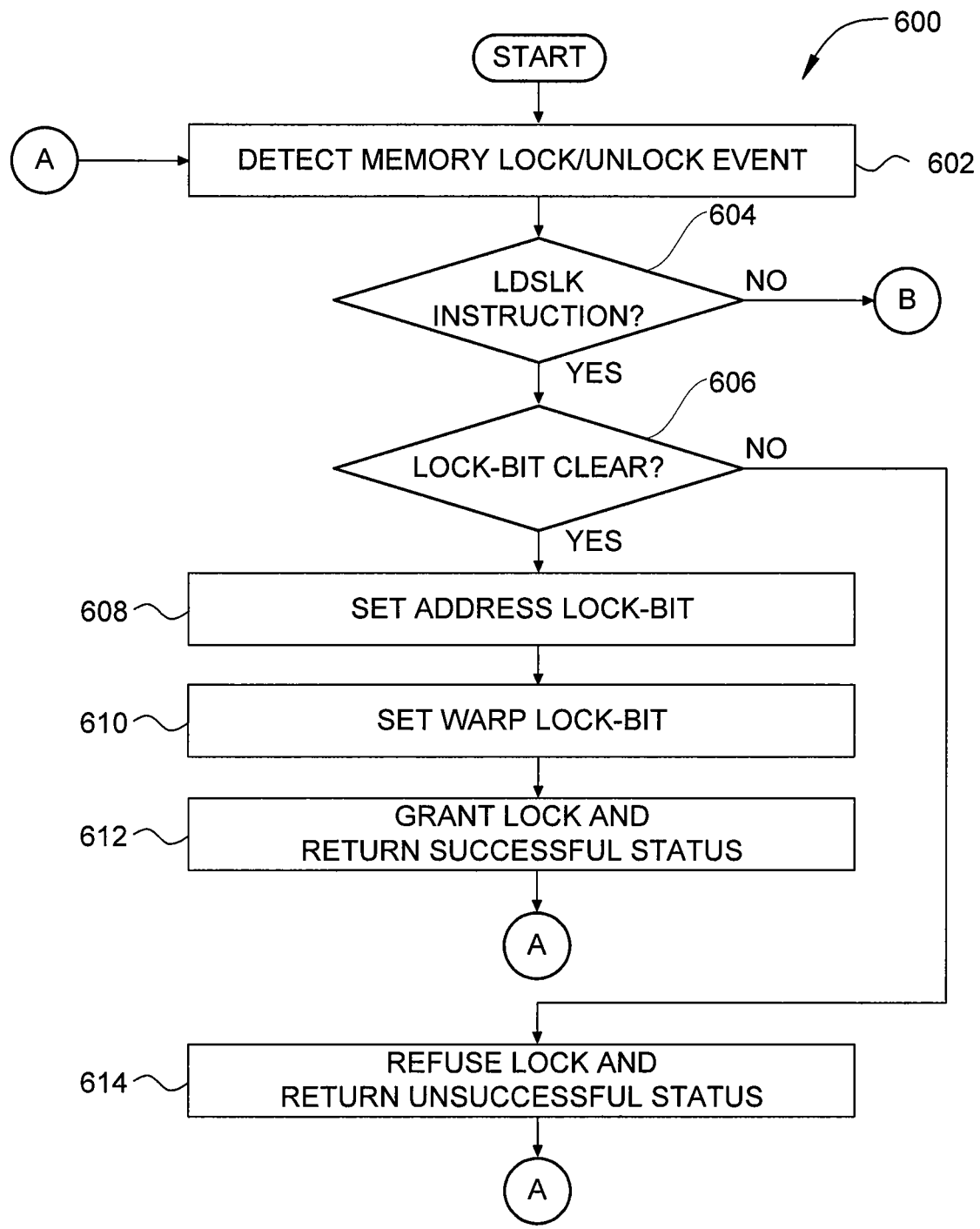
FIGS. 6A-6B set forth a flow diagram of method steps for managing lock bits for the shared memory of the streaming multiprocessor (SM) of FIG. 3, according to one embodiment of the present invention.
Figure 6B:
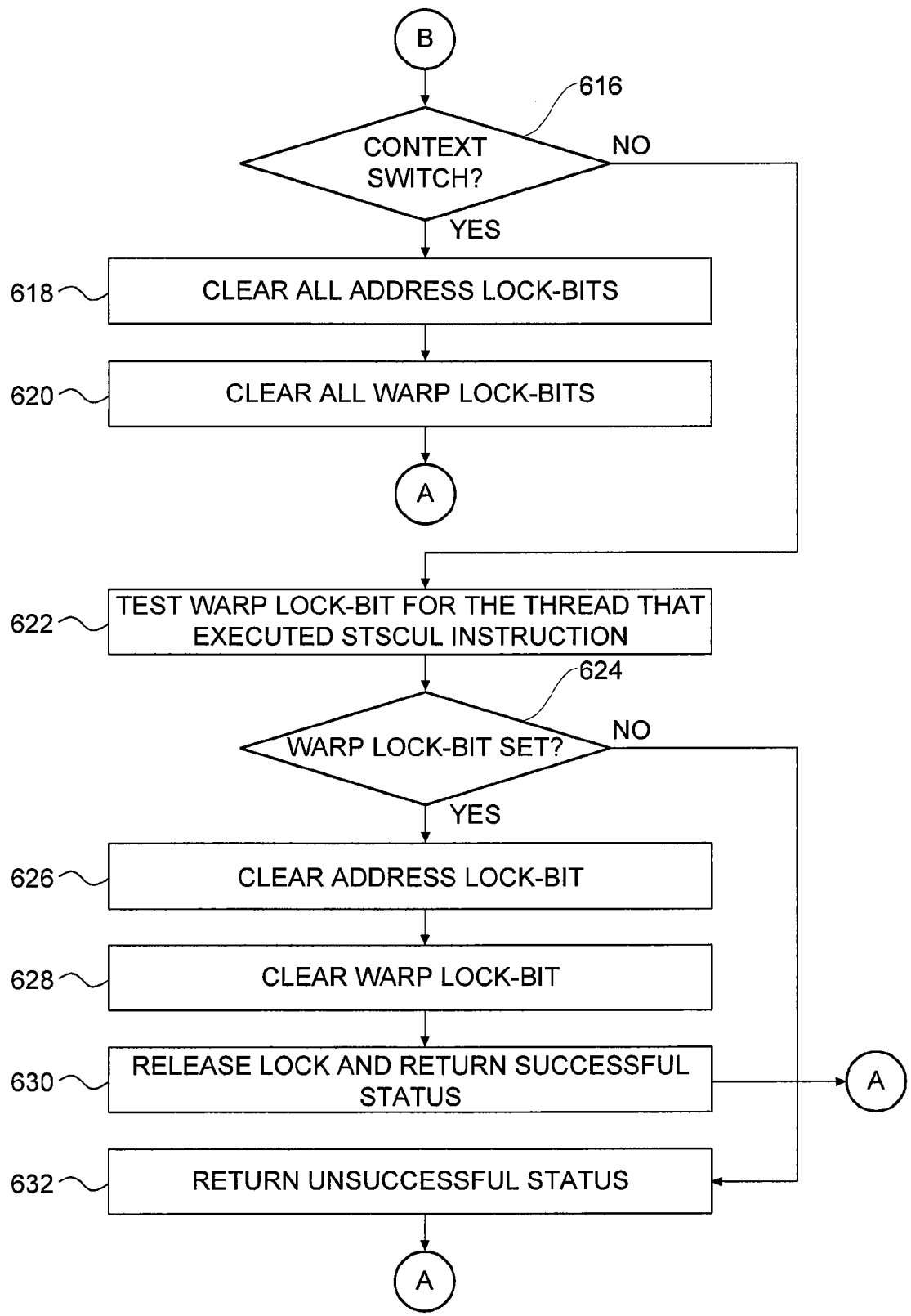

FIGS. 6A-6B set forth a flow diagram of method steps for managing lock bits for the shared memory 306 of the streaming multiprocessor (SM) 310 of FIG. 3, according to one embodiment of the present invention. Although the method steps are described in conjunction with the systems of FIGS. 1-3, persons of ordinary skill in the art will understand that any system configured to perform the method steps, in any order, is within the scope of the inventions.

As shown, a method 600 begins at step 602, where the SM 310 detects a memory lock/unlock event, such as a lock request, a lock release, or a context switch. At step 604, the SM 310 determines whether a thread executed a LDSLK instruction to load a value from an address in the shared memory 306 and secure a lock associated with that memory address. If a thread executed a LDSLK instruction, then the method 600 proceeds to step 606, where the SM 310 determines whether the address lock-bit 430 associated with the memory address is clear, indicating an unlocked condition. If the address lock-bit 430 is clear, then the method 600 proceeds to step 608, where the SM 310 sets the address lock-bit 430 associated with the memory address. At step 610, the SM 310 sets the warp-lock bit associated with the warp that includes the thread executing the LDSLK instruction. At step 612, the SM 310 grants the lock and returns a successful status to the thread executing the LDSLK instruction. The method 600 then returns to step 602, described above.

Returning to step 606, if the address lock-bit 430 is not clear, then the method 600 proceeds to step 614, where the SM 310 refuses the lock and returns an unsuccessful status to the thread executing the LDSLK instruction. The method 600 then returns to step 602, as previously described above.

Returning to step 604, if no thread executed a LDSLK instruction, then the method 600 proceeds to step 616, where the SM 310 determines whether a thread was preempted, resulting in a context switch. If a thread was preempted, then the method 600 proceeds to step 618, where the SM 310 clears all address lock-bits 430 in the address lock-bit table 460. At step 620, the SM 310 clears all warp lock-bits 530 in the warp lock-bit table 540. The method 600 then returns to step 602, as previously described above.

If, however, at step 616, no thread was preempted, then the lock/unlock event is that a thread has executed a STSCUL instruction. The method 600 proceeds to step 622, where the SM 310 tests the warp lock-bit 530 for the thread that executed a STSCUL instruction. At step 624, the SM 310 determines whether the warp lock-bit 530 for the warp that includes the thread is set. If the warp lock-bit 530 is set, then the method 600 proceeds to step 626, where the SM 310 clears the address lock-bit 430 for the memory address associated with the STSCUL instruction. At step 628, the SM 310 clears the warp-lock bit associated with the warp that includes the thread executing the STSCUL instruction. At step 630, the SM 310 releases the lock and returns a successful status to the thread executing the STSCUL instruction. The method 600 then returns to step 602, described above.

If, however, at step 624, the warp lock-bit 530 is not set, then the method 600 proceeds to step 632, where the SM 310 returns an unsuccessful status to the thread executing the STSCUL instruction. The method 600 then returns to step 602, as previously described above.

It will be appreciated that the system shown herein is illustrative and that variations and modifications are possible. In one example, the techniques described could be applied to a lock-protected shared memory 420 with any address range and data width. In another example, the address lock-bit table 460 could include any number of address lock-bits 430, including one address lock-bit 430 for each memory location 410. In this latter case, there would be no hash function unit 440, as there would be a one-to-one correspondence between address lock-bits 430 and memory locations 410. In another example, the techniques described could support any number of warps 510 in the set of warps, each warp having a corresponding warp lock-bit 530.

In sum, a streaming multiprocessor in a multi-threaded processing architecture maintains two lock-bit structures associated with accessing the shared memory via atomic operations. A first lock-bit structure maintains lock status for each memory address location in the shared memory. The first lock-bit structure may be subject to a hash function, where a single address lock-bit is shared among multiple memory locations in the shared memory. A second lock-bit structure maintains lock status on which warps have acquired a lock. When a warp acquires a lock for a specific memory location, both the memory address lock-bit in the first data structure and the warp lock-bit in the second data structure are set. When the warp releases the lock, both the memory address lock-bit in the first data structure and the warp lock-bit in the second data structure are reset. When any warp is preempted, resulting in a context switch, the streaming multiprocessor resets all address lock-bits and warp lock-bits. In such a case, all warps reacquire any previously acquired lock before completing the atomic operation. Because warp lock-bits are maintained separately from address lock-bits, the streaming multiprocessor correctly determines whether a particular address lock belongs to a particular warp. With this approach, a lock-bit state does not need to be preserved after a context switch, and deadlock is avoided.

One advantage of the disclosed techniques is that acquired locks are released when a thread is preempted. As a result, a preempted thread that has previously acquired a lock does not retain the lock indefinitely. Active threads may acquire the lock previously acquired by the preempted thread, resulting in improved performance and deadlock avoidance. When the preempted thread resumes, the thread reacquires the previously released lock before completing the atomic operation.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for processing atomic operations for a plurality of threads in a multi-threaded architecture, the method comprising:
    receiving a first request from a first thread in a first thread group to acquire access to a first memory location in a lock-protected shared memory;
    determining whether a first address lock in a plurality of address locks is asserted, wherein the first address lock is associated with the first memory location;
    if the first address lock is asserted, then
        refusing the first request; or
    if the first address lock is not asserted, then
        asserting the first address lock;
        asserting a first thread group lock in a plurality of thread group locks, wherein the first thread group lock is associated with the first thread group; and
        granting the first request.

2. The method of claim 1, wherein the first request is associated with an instruction to load a value from the first memory location.

3. The method of claim 1, further comprising:
receiving a second request from the first thread to release access to the first memory location;
determining that the first thread group lock is asserted;
clearing the first address lock;
clearing the first thread group lock; and
granting the second request.

4. The method of claim 3, wherein the second request is associated with an instruction to store a value into the first memory location.

5. The method of claim 1, further comprising:
determining that at least one thread in the plurality of threads is subject to a context switch;
clearing each address lock in the plurality of address locks; and
clearing each thread group lock in the plurality of thread group locks.

6. The method of claim 5, further comprising:
receiving a second request from the first thread to release access to the first memory location;
determining that the first thread group lock is cleared; and
refusing the second request.

7. The method of claim 5, further comprising:
receiving a third request from a second thread in a second thread group to acquire access to the first memory location;
determining whether the first address lock is asserted;
if the first address lock is asserted, then
refusing the third request; or
if the first address lock is not asserted, then
asserting the first address lock;
asserting a second thread group lock in the plurality of thread group locks, wherein the second thread group lock is associated with the second thread group; and
granting the third request.

8. The method of claim 1, wherein the first address lock is associated with the first memory location via a hash function.

9. The method of claim 1, wherein the first address lock is included within a first bank associated with a plurality of banks of address locks.

10. A subsystem comprising:
a lock-protected shared memory; and
a streaming multiprocessor coupled to the lock-protected shared memory and configured to process atomic operations associated with the lock-protected shared memory by performing the steps of:
receiving a first request from a first thread in a first thread group to acquire access to a first memory location in a lock-protected shared memory;
determining that a first address lock in a plurality of address locks is not asserted, wherein the first address lock is associated with the first memory location;
asserting a first thread group lock associated with the first thread group; and
granting the first request.

11. The subsystem of claim 10, wherein the first request is associated with an instruction to load a value from the first memory location.

12. The subsystem of claim 10, wherein the streaming multiprocessor is further configured to perform the steps of:
receiving a second request from the first thread to release access to the first memory location;
determining that the first thread group lock is asserted;
clearing the first address lock;
clearing the first thread group lock; and
granting the second request.

13. The subsystem of claim 12, wherein the second request is associated with an instruction to store a value into the first memory location.

14. The subsystem of claim 10, wherein the streaming multiprocessor is further configured to perform the steps of:
determining that at least one thread in the plurality of threads is subject to a context switch; and
clearing each address lock in the plurality of address locks.

15. The subsystem of claim 14, wherein the streaming multiprocessor is further configured to perform the steps of:
receiving a second request from the first thread to release access to the first memory location;
determining that the first thread group lock is cleared; and
refusing the second request.

16. The subsystem of claim 14, wherein the streaming multiprocessor is further configured to perform the steps of:
receiving a third request from a second thread in a second thread group to acquire access to the first memory location;
determining whether the first address lock is asserted;
if the first address lock is asserted, then
refusing the third request; or
if the first address lock is not asserted, then
asserting the first address lock;
asserting a second thread group lock associated with the second thread group; and
granting the third request.

17. The subsystem of claim 10, wherein the first address lock is associated with the first memory location via a hash function.

18. The subsystem of claim 10, wherein the first address lock is included within a first bank associated with a plurality of banks of address locks.

19. A computing device configured to process atomic operations associated with a lock-protected shared memory comprising:
a shared memory; and
a streaming multiprocessor coupled to the shared memory and configured to
receive a first request from a first thread in a first thread group to acquire access to a first memory location in the shared memory;
determine that a first address lock associated with the first memory location is not asserted;
assert a first thread group lock associated with the first thread group; and
grant the first request.

20. The computing device of claim 19, wherein the streaming multiprocessor is further configured to:
receive a second request from the first thread to release access to the first memory location;
clear the first thread group lock; and
grant the second request.

* * * * *